Nov. 22, 1927.　1,649,901
A. HOUGH
METHOD OF AND APPARATUS FOR MAKING NITRIC ACID
Filed March 27, 1925　3 Sheets-Sheet 1

Nov. 22, 1927. 1,649,901
A. HOUGH
METHOD OF AND APPARATUS FOR MAKING NITRIC ACID
Filed March 27, 1925 3 Sheets-Sheet 3
*Fig. 3.*
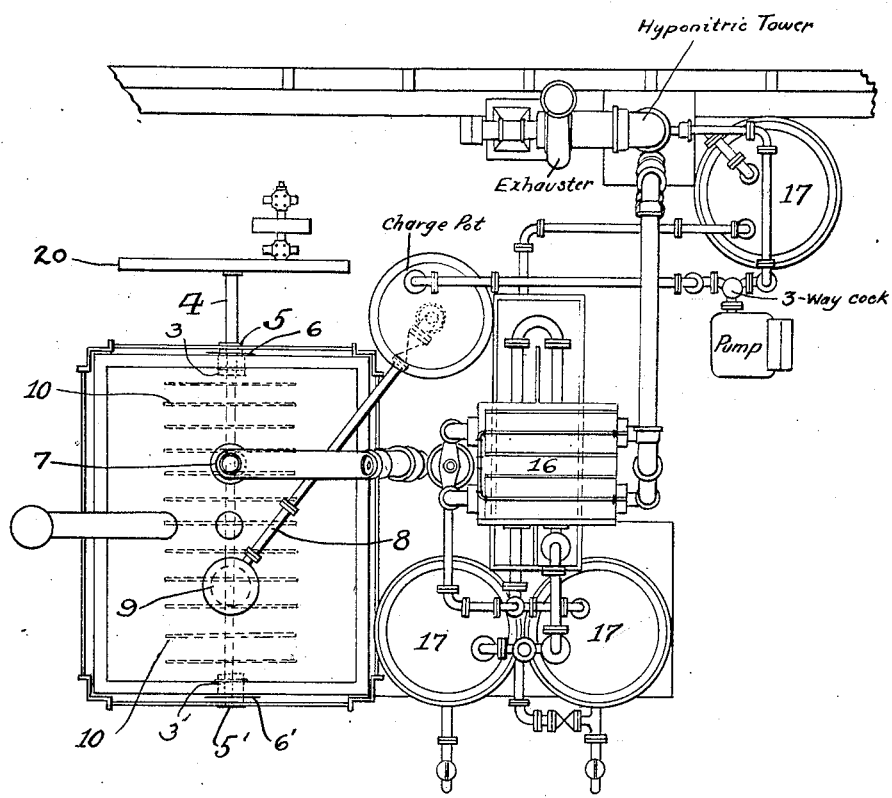
*Fig. 4.* *Fig. 5.*
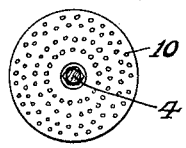 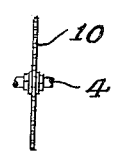
INVENTOR:
Arthur Hough,
BY
His ATTORNEY.

Patented Nov. 22, 1927.

1,649,901

UNITED STATES PATENT OFFICE.

ARTHUR HOUGH, OF SUMMIT, NEW JERSEY, ASSIGNOR TO THE DURIRON COMPANY, INC., OF NEW YORK, N. Y., A CORPORATION OF NEW YORK.

METHOD OF AND APPARATUS FOR MAKING NITRIC ACID.

Application filed March 27, 1925. Serial No. 18,723.

This invention relates to improvements in the production of nitric acid and has for its principal objects the economical production of nitric acid of a high degree of purity and strength and the provision of an apparatus for such production which is extremely economical in original cost and in operation and maintenance, besides being highly effective and compact.

In the production of nitric acid from the reaction of sodium nitrate or its equivalent and sulphuric acid, it is a desideratum that the two ingredients should be maintained from the very start of the operation in a most intimate state of admixture, furthermore, that the exposed surface of the liquid should be as extensive as possible in order to permit of the most efficient evaporation of the vapors and also that the still in which the reaction is being carried out should be so mounted as to permit of the perfect regulation of the temperature thereof, particularly of the upper portion thereof in order to prevent both condensation and decomposition of the nitric acid vapors either under low temperatures or abnormally high temperatures.

The aforesaid conditions while highly desired in good nitric acid plants are, at the present time, not even approached either in plants employing the old pot type of still or in the vacuum type of plant, but in my improved type of nitric acid plant, as hereinafter described, it is possible to maintain the aforesaid conditions and to comply with the aforesaid desired requirements of an ideal plant in the most satisfactory manner whereby it is possible to construct a plant capable of the production of nitric acid of the highest degree of purity and strength in a minimum time of operation, and consequently at a minimum price with but a very small initial capital investment.

In the accompanying drawings forming a part of this specification, I have illustrated a plant embodying the preferred form of my invention. In said drawings Figure 1 is a front elevation;

Fig. 3 is a plan view of a portion of a nitric acid plant embodying my invention, and Figs. 4 and 5 are detail plan and section of one of the discs employed, respectively.

Figure 1:
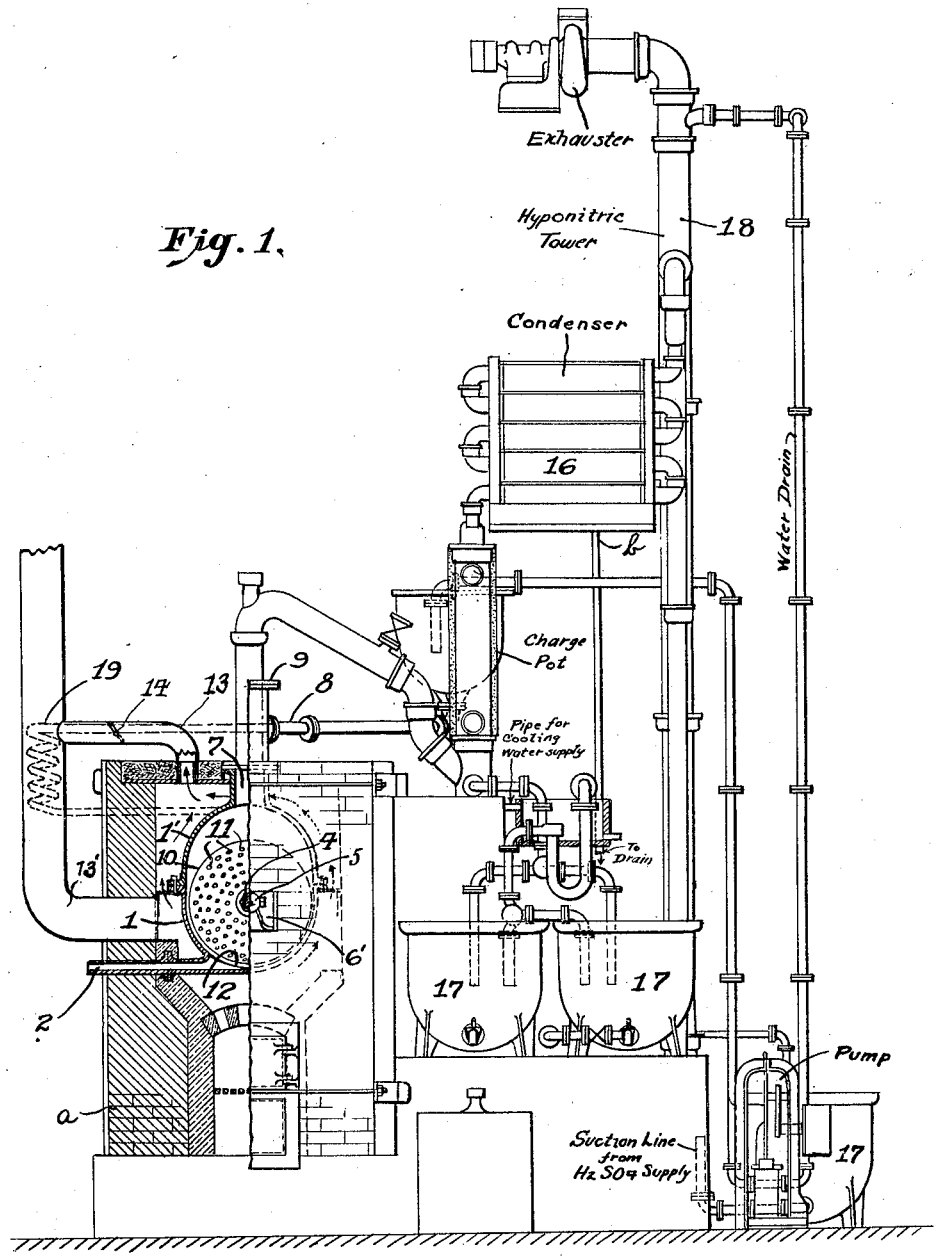
Figure 2:
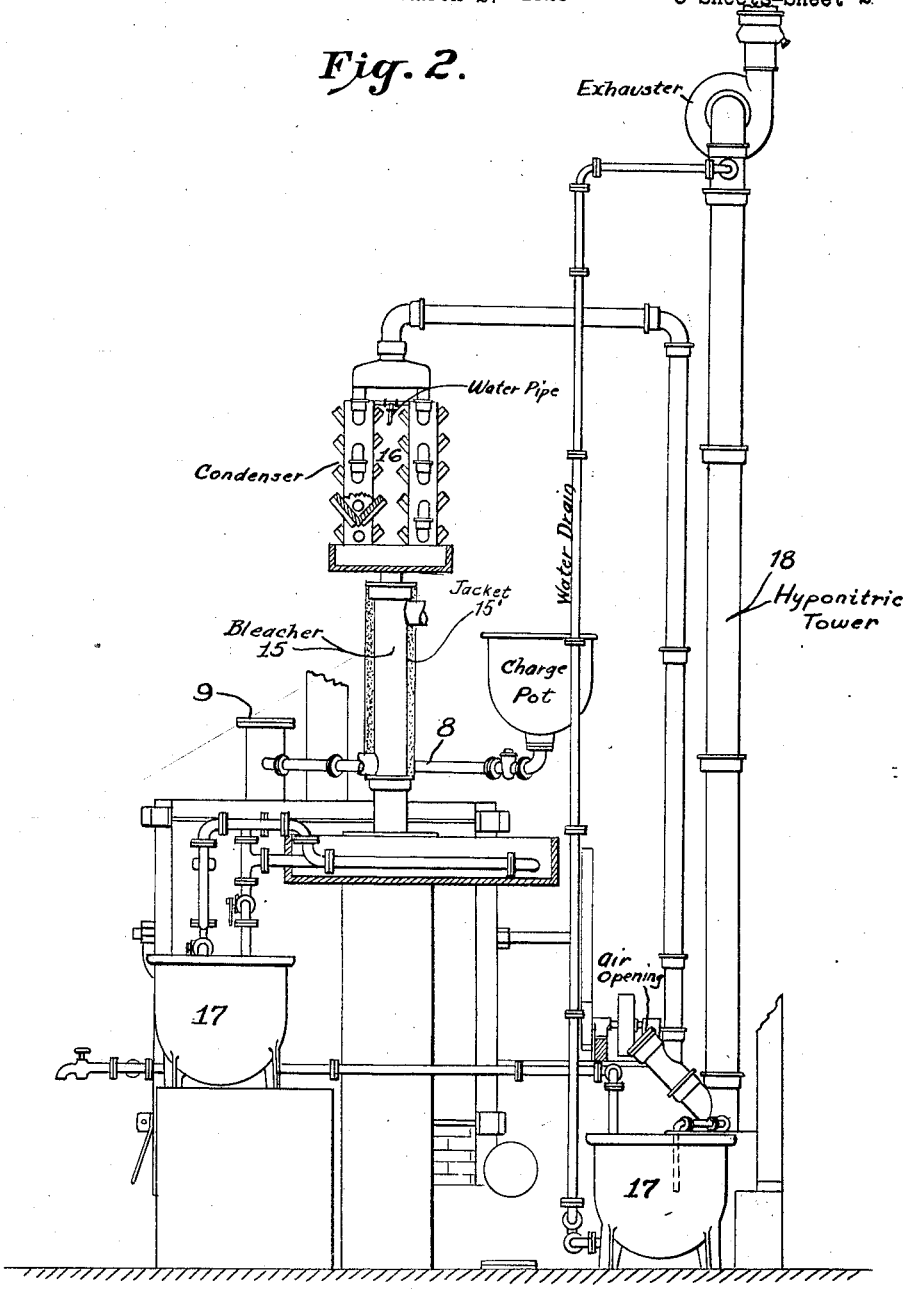
Fig. 2 is a side elevation.

Referring to the drawings and the construction shown therein, reference numerals 1, 1' designate the two sections comprising a duplex nitric acid still of the horizontal type which is formed in two sections, the lower section being provided with a discharge conduit 2 for the removal of nitre cake and having stuffing boxes 3, 3' mounted in the respective ends thereof, which latter serve to receive a shaft 4. Such shaft is supported at each end in bearings 5, 5' mounted in suitable brackets 6, 6' and said still is supported in the customary manner by brackets of suitable brick work mounted as designed by the reference numeral $a$.

The upper section 1' of the still is provided with a vapor outlet 7, an acid inlet conduit 8 and an aperture 9 through which the charge of sodium nitrate or its equivalent is introduced into the still. Mounted on the said shaft 4, which preferably consists of close grain cast iron having a steel core, is a series of discs 10, provided with perforations 11, preferably of cast iron. These perforated discs perform a dual function of mixing and evaporating units since the discs are adapted to serve as very efficient agitators while the mass is in a liquid phase and cut their way through the mass as it assumes a solid phase continuing so long as the mass remains in this latter state but also as the soft or fluid phase again develops, the perforated discs will pick up the mixture and resume the normal agitation function. If desired, in lieu of the perforations, discs 10 may be provided with radial grooves or otherwise ribbed or roughened in order to admit of the same serving as effective mixers or agitators as aforesaid.

The lower section 1 of said still as shown slopes towards the nitre cake discharge conduit 2 and is provided with a well 12 which extends parallel with such shaft 4 and at right angles to said discs 10 which is adapted to receive any solid nitre cake, thus preventing the same being seized or picked up by the discs.

Said sections of the still are mounted in a flue of a furnace which may be of any suitable type, the gases from which pass under the still and some go over the top of the upper section of the still. A damper 14 is disposed within the outlet pipe 13 from the said flue in such a manner that the temperatures of the gases which pass over the upper section of the still can be readily adjusted and maintained at a predetermined point in order to prevent condensation of nitric acid vapors which would create a condition disastrous to the life of the still cover and also to prevent decomposition of the strongest nitric acid which is very sensitive to heat, due to over heating the same, thus enabling the latter acid to be recovered along with the other strength of acid with the result that the blend of the various strengths will be increased.

A bleacher 15 provided with a jacket 15′ is interposed between a condenser 16, the latter being of the reflux type, and the vapor outlet 7 of the upper section 1′ of the still, such bleacher serving to eliminate the lower oxides of nitrogen from the nitric acid and delivering water-white acid to receivers 17, the lower oxides of nitrogen passing into oxidizing towers 18, wherein they are admixed with the water and air and converted to 50% nitric acid in the usual way. The aforesaid bleaching action is based on the principle of low solubility of lower oxides of nitrogen in hot nitric acid and the ready solubility of the same low oxides of nitrogen in cold nitric acid. This principle is utilized by the passage of the hot nitric acid vapors from the vapor outlet to the base of the bleacher, thence upwardly through the reflux condenser wherein the colder nitric acid is refluxed back into the bleacher and therein meets hot nitric acid vapors, with the consequence that the liquid nitric acid is thus maintained at a temperature approximating its boiling point at which temperature the low oxides of nitrogen are practically thrown completely out of the solution of nitric acid and pass completely through the system to the hyponitrous oxidizing towers.

Since the functioning of the bleacher is dependent upon the maintenance of both it and the nitric acid distillate entering the same at a high temperature, otherwise as is apparent from the foregoing explanation, were the bleacher cold, the first runnings of nitric acid obtained would contain a considerable percentage of low oxides of nitrogen which would be highly undesirable.
The strength of the sulphuric acid and the relative amount of sodium nitrate and sulphuric acid which are employed in the operation of the still will vary according to the local conditions and the purpose for which the nitre cake is to be utilized. In those cases where a maximum strength of the nitric acid blend is desired, it is advisable to employ sulphuric acid of 96% $H_2SO_4$ content and a substantially dry sodium nitrate. In those cases where a weaker nitric acid only is required, then it is possible to employ sulphuric acid of a weaker content and normal damp sodium nitrate of the ordinary moisture content.
In order to effectively dry the nitrate of soda, the same is first placed in the stills and, while the discs are rotating, a low degree of heat is applied to the still. The thorough agitation that the nitrate of soda is therein subjected to, together with the gentle heat employed, will evaporate the water from the sodium of nitrate which will, of course, be condensed in the main condenser, and flow out through the outlet b of the said condenser. Such water distillate is prevented from entering the main nitric acid receiver by means of a by-pass of any desired form and is usually discarded. When the water ceases to be given off from the sodium nitrate in the still, the sulphuric acid is introduced into the still and the reaction resulting in the production of the nitric acid commences.

If the temperature of the sulphuric acid entering the still is extremely cold, as would ordinarily be the case in cold weather, particularly in large plants, it will have a tendency to crack the heated still which, of course, would be a matter of serious moment.
It is preferred, therefore, to heat such acid before it enters the still and to accomplish in an efficient and practical manner a small tube heating unit 19 (preferably of cast iron) is positioned in the stack 13′, wherein there is ample waste heat for this purpose and this heater is employed to preheat the sulphuric acid in its passage to the still. Through this arrangement it is possible to easily raise the temperature of the sulphuric acid to a safe temperature to pass into the still, for example about 80° C., which temperature moreover is sufficient to induce instant or immediate distillation of the nitric acid upon the contact of the sulphuric acid with the charge of sodium nitrate previously introduced into the still.

The reactions ocurring between the nitrate of soda and the sulphuric acid employed are somewhat complicated, as the mass passes through several phases; for example, when the mixture is first heated up there is a quantity of acid vapors evolved, but after a short time the mass enters into the solid phase. In this latter condition it has been found to be extremely difficult, if not impossible, to accomplish effective agitation by means of an ordinary propeller type of agitator and at the best but a small portion of the mass while in a liquid phase could be agitated by such a propeller. When the mass, however, became solid or even the heavy viscous phase developed, such a propeller would bind and become perfectly useless. With my improved disc type of agitator herein described, the disc continues to function irrespective of the condition of the mass within the still, for example, when the solid phase develops, the disc simply cut their way through the solid mass and continue to rotate without interruption until such time as the soft or fluid phase has developed, whereupon they will, as previously stated herein, continue to seize or pick up the mixture and to function normally.

The shaft 4 upon which the discs 10 are mounted, is relieved of all strain or wear by means of the bracket bearings 5, 5' and one end of such shaft is caused to project sufficiently beyond the still to permit of the gears 20 being attached thereto, which latter is adapted to be connected to a driven gear in a train of power operated gearing in the well known manner.

The functioning of the foregoing apparatus is so complete that the quantity of acid produced in the oxidizing towers is so small that it can be charged into the still with the succeeding charge of nitrate of soda and sulphuric acid and distilled over as strong acid without such addition of acid unduly raising the sulphuric acid content of the nitre cake. For example, it has been ascertained that the amount of low oxides of nitrogen resulting from the reactions in this improved type of still amounts to only about 3% of the total nitric acid represented in the nitrate of soda. In the old pot type of still, this percentage averages about 12% to 15%.

The aforesaid damper 14 is so arranged within the pipe 13 that a predetermined quantity of the flue gases which have passed over the upper section of the still can be mixed with the stack gases, thereby lowering the temperature of said flue gases to the point required to heat the upper section 1' of the still to the requisite degree necessary to prevent condensation of the nitric acid vapors and decomposition of the strongest nitric acid as hereinbefore stated.

In the production of nitric acid by my aforesaid invention, the agitated mass is continuously maintained in the form of a film; the charge in the still is not only constantly agitated, but is converted into a plurality of films which are peculiarly efficient for permitting of the free escape of the nitric acid vapors while the mass is still at a comparatively low temperature by virtue of the extremely large surface which is afforded by the films for this purpose, for example, by the employment of the aforesaid discs, it is possible in practice to afford a film evaporating surface having some fifteen times the total interior surface of the still. Furthermore, the perfect regulation of the temperature of the still, particularly of the upper section thereof, results in not only greatly prolonging the life of the still, but also in greatly reducing the proportions of the nitric acid or lower oxides of nitrogen resulting from the decomposition of the strongest nitric acid which passed to the oxidizing towers.

Heretofore, in the best nitric acid plants, it has been impossible to attain or even approach the ideal conditions herein described as attainable by my invention, and all attempts to attain the same by means of a vacuum type of plant, however modified, have resulted in failure.

The coil 19 and the pipe connecting same to pipe 8, while shown in dotted lines as indicating that same, may be omitted, is preferably employed, as thereby the waste heat is most effectively utilized, a matter of which is of no inconsiderable moment in the production of nitric acid.

Preferably in order to further conserve the heat of the flue gases or other heating medium introduced into the jacket 15', the same is insulated with heat insulating material, as magnesia, asbestos or the like.

While I have described the preferred type of apparatus in which my improved method, as preferably shown can be carried out, it is, of course, understood, without departing from the spirit of my invention, that various modifications both in the method and apparatus herein described within the scope of the appended claims can be made without departing from the spirit of my invention as covered by such claims.

Having thus described my invention, what I claim and desire to obtain by United States Letters Patent is:

1. Method of making nitric acid which consists in subjecting a reacting mass including sulphuric acid and a nitrate capable of yielding nitric acid vapors when heated, to a distilling temperature while constantly agitating the mass being treated and causing separate portions of the same to be simultaneously presented in the form of separate films to permit of the free escape of acid vapors therefrom at comparatively low temperatures and then recovering the nitric acid evolved from such treatment.

2. Method of making nitric acid which consists in subjecting a reacting mass comprising an alkali-metal nitrate and concentrated sulphuric acid capable of yielding nitric acid vapors when heated, to a distilling temperature while constantly agitating the mass being treated and causing several portions of the same to be simultaneously presented in the form of separate films to permit of the free escape of acid vapors therefrom at comparatively low temperatures and then recovering the nitric acid evolved from such treatment.

3. Method of making nitric acid which consists in subjecting a reacting mass comprising sodium nitrate and strong sulphuric acid in substantially equivalent proportions to produce nitric acid, while constantly agitating the mass being treated and causing different portions of the same to be simultaneously presented in the form of separate films to permit of the free escape of acid vapors therefrom at comparatively low temperatures and then recovering the nitric acid evolved from such treatment.

4. The method of making nitric acid which consists in causing a rotating disc member to penetrate below the surface of a reacting mass comprising strong sulphuric acid and alkali metal nitrate, elevating portions of such material from said mass above the surface thereof on said disc member in the form of a plurality of films and simultaneously subjecting the treated mass to a sufficient temperature to effect distillation of nitric vapors therefrom and recovering the acid vapors so evolved.

5. The method of making nitric acid which consists in continuously disrupting a reacting mass comprising strong sulphuric acid and a nitrate by means of a plurality of cutting devices capable of maintaining effective agitation even when the mass assumes an incipient solid phase and presenting portions of such mass in the form of a plurality of films on opposite side of such cutting device, simultaneously subjecting the mass to a sufficient temperature to distill the nitric acid vapors and recovering the nitric acid vapors so evolved.

6. The method of making nitric acid which consists in subjecting a charge, comprising strong sulphuric acid and a nitrate compound capable of reacting therewith to form nitric acid to a temperature sufficient to distill nitric acid as formed while constantly agitating the mixture and periodically presenting portions thereof in the form of thin layers above the normal surface of the mixture and then recovering the nitric acid vapors evolved.

7. The method of making nitric acid which consists in subjecting a charge, comprising strong sulphuric acid and a nitrate compound capable of reacting therewith to form nitric acid to a temperature sufficient to distill nitric acid as formed while constantly agitating the mixture and periodically presenting portions thereof in the form of thin layers above the normal surface of the mixture and then recovering the nitric acid vapors evolved, by causing the evolved nitric acid vapors to pass into a condenser and returning the condensed acid into contact with freshly evolved nitric acid vapors passing to such condenser.

8. The herein described apparatus comprising an acid still having a vapor outlet, agitating means therein including a plurality of rotating discs and means for heating said still.

9. The herein described apparatus comprising an elongated still having a longitudinal series of agitator discs rotatably mounted therein, certain of said discs being provided with means for facilitating the elevation of liquid by said discs when the same are partially submerged in a charge of material being treated in said still, means for rotating said discs and means for heating said still.

10. The combination comprising a nitric acid still provided with disc-like means capable of revolving therein and adapted to agitate a charge being treated in said still whether the same exists in a liquid or a semi-solid phase and means for revolving said disc-like means.

11. The method of making nitric acid which consists in gradually mixing concentrated sulphuric acid with an alkali-metal nitrate while subjecting the mixture in a furnace to a distilling temperature, said sulphuric acid, prior to admixture with said nitrate, being preheated by the waste gases of such furnace, and consequently agitating the mass during such treatment.

12. The method of making nitric acid which consists in gradually mixing concentrated sulphuric acid with an alkali-metal nitrate while subjecting the mixture in a furnace to a distilling temperature, said sulphuric acid, prior to admixture with said nitrate, being preheated by the waste gases of such furnace and consequently agitating the mass during such treatment by causing several portions of the same to be simultaneously presented in the form of separate films to permit of the free escape of acid vapors therefrom at comparatively low temperatures and then recovering the nitric acid evolved from such treatment.

Signed at Summit, in the county of Union and State of New Jersey, this 21 day of March, 1925.

ARTHUR HOUGH.